Patented June 5, 1951

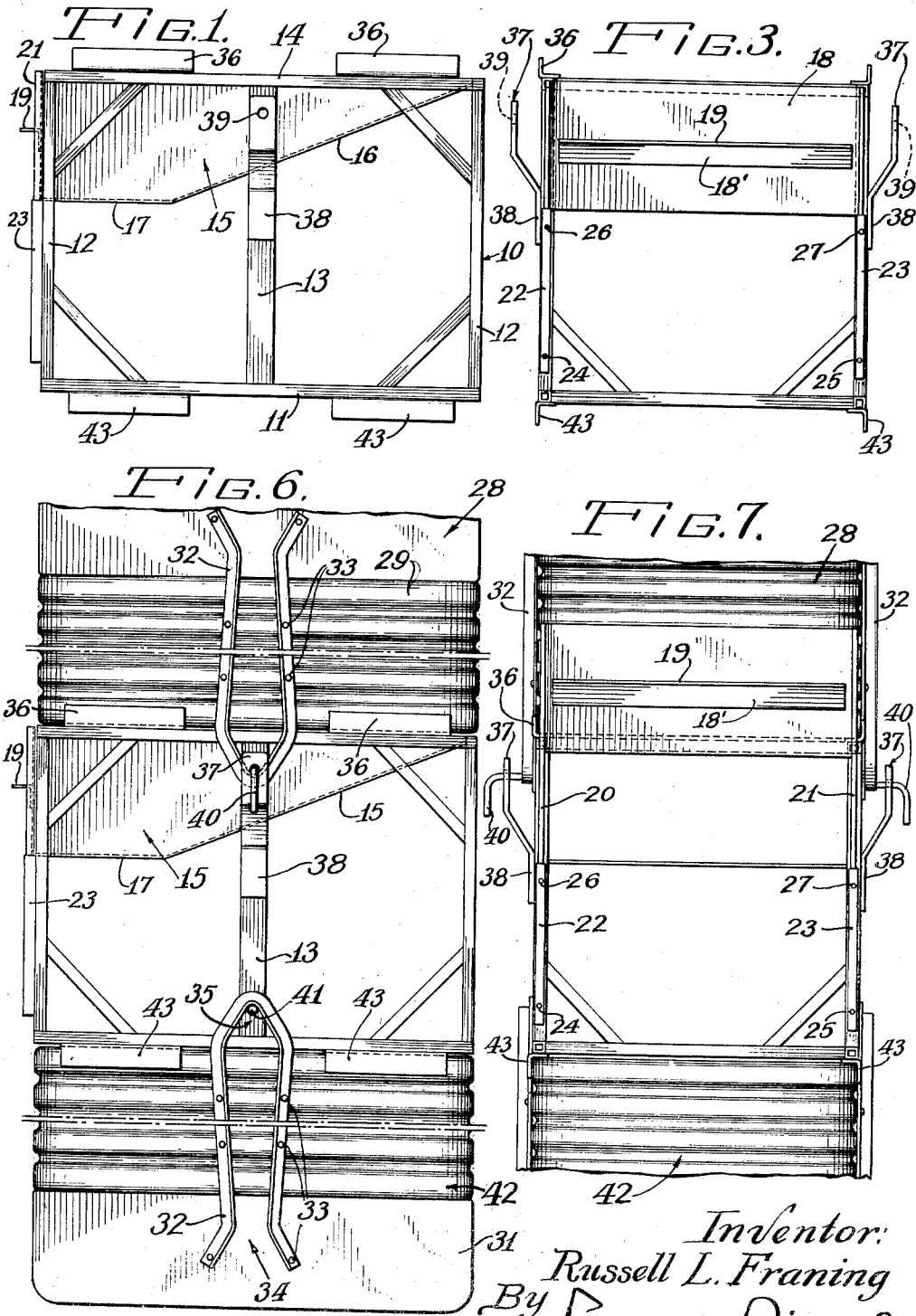

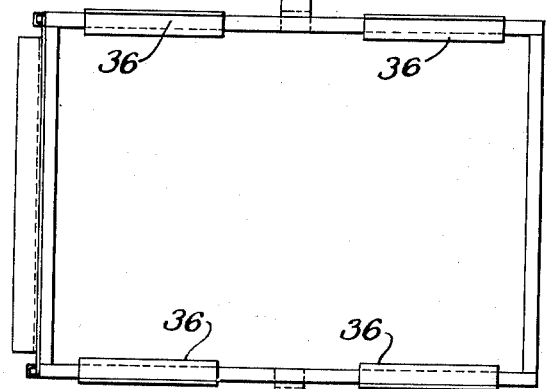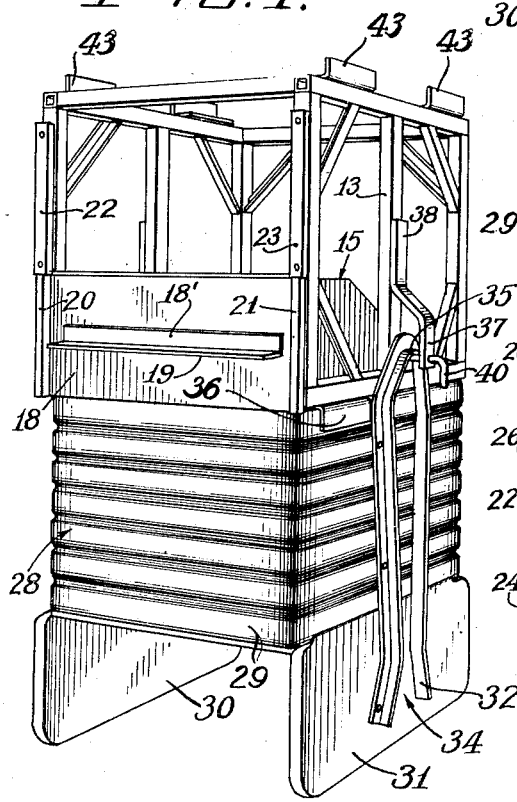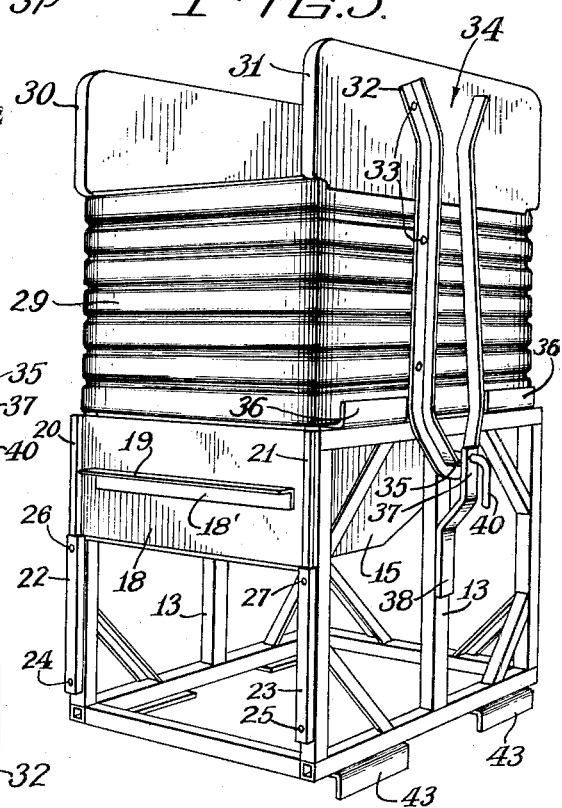

2,555,537

UNITED STATES PATENT OFFICE 2,555,537

DELIVERY HOPPER FOR PORTABLE STORAGE BINS

Russell L. Franing, Milan, Ill., assignor to International Harvester Company, a corporation of New Jersey Application November 16, 1948, Serial No. 60,354

7 Claims. (Cl. 222—129)

This invention relates to a new and improved delivery hopper for portable storage bins.

Portable storage bins are utilized for many purposes in shops and factories. These bins as a rule are made to nest vertically one on the other so that the storage of articles within the bins may be economical with respect to floor space. Further, the bins are designed for portability and movement around the shop by vehicles commonly known as fork trucks.

Portable storage bins are also used along assembly lines to supply workers with articles to be applied to the assembly of machines. Oftentimes one man is required to assemble more than one article and as a result must have easily available the portable storage bins holding the several individual items which he must assemble. This multiple article assembly has required considerable floor space around each assembly worker and as a result the assembly line is considerably lengthened.

It is a principal object of this invention to provide a combination hopper and spacer device capable of adjoining two portable storage bins in such a manner that the two contents of both bins are maintained separate and both readily available for use by an assembly operator or the like.

An important object of this invention is the provision of a hopper device adapted to conveniently discharge the contents of an inverted portable storage bin.

Another important object of this invention is to provide a hopper device adapted to be mounted on a portable storage bin and beneath an inverted portable storage bin so that the contents of the first storage bin are readily accessible and the contents of the inverted storage bin are readily accessible through the hopper device.

A still further important object of this invention is to provide a hopper structure capable of assuming a fixed relationship with respect to a portable storage bin and adapted further to be removably mounted on a second portable storage bin and having guiding elements thereon to maintain vertical alignment between the two portable storage bins and the hopper structure.

Another and still further important object of this invention is to provide a hopper structure for accommodating discharge of the contents of an inverted portable storage bin and having an adjustable sliding opening therefor.

Other and further objects will become apparent from the disclosures in the following specification and accompanying drawings.

In the drawings:

Fig. 1 is a side elevational view of the hopper of this invention.

Fig. 2 is a top plan view of the device of Fig. 1.

Fig. 3 is a front view of the device as shown in Figs. 1 and 2.

Fig. 4 shows a perspective view of the device shown attached to the top of a portable storage bin.

Fig. 5 is a perspective view of the device of Fig. 4 inverted for operational use.

Fig. 6 is a side elevational view of the device of Fig. 5 mounted on top of a second portable storage bin.

Fig. 7 is a front view of the device as shown in Fig. 6.

As shown in the drawings, reference numeral 10 indicates generally a rectangularly shaped frame-like supporting structure having a rectangular base 11, four vertical corner posts 12 and auxiliary vertical members 13 extending from the base 11 upwardly to a rectangular top portion 14. The members 13 are oppositely disposed on the sides of the structure.

The upper part of the frame structure 10 carries a hopper 15. The hopper comprises an inclined bottom portion 16 and an adjoining horizontal bottom portion 17. The front of the hopper 15 is provided with a vertically slidable closure in the form of a door or gate 18. An angle member 18' is welded or otherwise fastened to the closure 18 and extends across the front thereof having its outwardly extending lip 19 acting as a hand engaging means for raising the gate 18 to gain access to the hopper 15. The closure member 18 is provided with downwardly extending leg or guide members 20 and 21 which are adapted to slide respectively within tubular sockets 22 and 23 respectively. Both the guide members 20 and 21 and the tubular receiving sockets 22 and 23 are preferably square in cross section. The socket members 22 and 23 are welded or otherwise fastened to the corner support posts 12 of the hopper structure 10.

As best shown in Fig. 3 the closure member 18 is locked in hopper closing position by means of pins 24 and 25 passing through aligned apertures in the sockets 22 and 23 and their respective guided members 20 and 21. When it is desired to open the hopper door 18 the pins 24 and 25 are removed and the door raised by means of the handle 18'—19. When the gate is in fully opened position the pins 24 and 25 are reinserted through the upwardly spaced apertures 26 and 27 and as shown in Fig. 6 the gate is in open position with the pins 24 and 25 within the apertures 26 and 27 respectively. It will thus be seen that the hopper door 18 may be locked in either open or closed position. Beneath the hopper is a relatively open space in the supporting structure 10 with a minimum of structural members.

As best shown in Fig. 4 a portable storage bin 28 is provided with a box portion 29 and downwardly spaced legs 30 and 31. The spaced legs or side members 30 and 31 permit the transporting of the hopper by means of a fork truck having a forwardly extending tongue adapted to be driven into the space defined by the spaced legs 30 and 31. The truck tongue is then raised so that the legs 30 and 31 leave the floor whereupon the bin is ready for removal to some other part of the shop by means of the truck. Means are provided on the sides of the storage bins for accommodating a vertical nesting of a plurality of storage bins. The nesting elements or means comprise an angle member 32 riveted or otherwise fastened to the side walls of the storage bin 28 as shown at 33. The angle member is shaped as a hairpin so that it forms a V-shaped socket at the lower end indicated by the reference numeral 34 and a V-shaped projection 35 on the top thereof extending above the box portion 29 of the storage bin 28. It will thus be seen that as the storage bins are placed one on top of the other the V-shaped projection will nest upwardly within the V-shaped socket or opening in the bottom of the angle member nesting means 32 of the storage bin immediately thereabove. In the present invention we are not concerned with the nesting of storage bins in this manner. However, the storage bins are made with this construction and the nesting mechanism is utilized for fastening the hopper structure of this invention to the storage bins.

As further best shown in Fig. 4 the hopper structure of the Figs. 1, 2 and 3 has been inverted and placed on top of the portable storage bin 28. Angle members 36 on the top of the hopper structure 10 are adapted to extend down in telescoping fashion over the side walls of the box portion 29 of the storage bin 28. These angle members thus provide guiding means and vertical alignment means for the storage bin and inverted hopper structure. In addition to the skirting of the storage bin by the angle members 36 means are provided for locking the hopper to the storage bin so that the device becomes a single unit. Each of the oppositely disposed vertical structural members 13 carries a bracket member 37. The brackets 37 are welded or otherwise fastened at 38 to the members 13 and thereupon project outwardly and thence upwardly in parallelism with the members 13. The brackets 37 are provided with apertures 39 and as best shown in Fig. 4 removable pins 40 are adapted to pass through the apertures 39 in the brackets 37 and thence through the openings 41 provided with the V-shaped projections 35 of the nesting means on the portable storage bin 28. Thus, as shown in Fig. 4, the pins 40 maintain the inverted hopper structure 10 in fixed relationship with respect to the portable storage bin 28.

The device as shown in Fig. 4 is then completely inverted so that the portable storage bin 28, as shown in Fig. 5, is upside down and is on top of the hopper structure 10. The contents of the storage bin immediately drop into the hopper 15 and are therefore available for removal through the gate member 18. The device may be used in the manner indicated in Fig. 5 without further attachments thereto. However, for greater utilization of floor space the entire inverted structure as shown in Fig. 5 is raised up and mounted on a second portable storage bin 42 as shown in Figs. 6 and 7. Angle members 43 on the bottom of the hopper structure 10 are adapted to telescope over the sides of the second storage bin 42 in a manner similar to the angle members 36 for aligning the storage bin with respect to the hopper structure. With the first storage bin and hopper structure superposing the second storage bin the operator has available the contents of two portable storage bins in the same vertical position and may conveniently remove the contents from the upper bin through the hopper door or gate 18 and from the lower bin through the open space beneath the hopper 15 in the supporting structure practically simultaneously. In the event the device is used in a production line wherein the operator applies its articles to the assembly then full utilization of the device of this invention is obtained.

Many details of construction may be varied throughout a wide range and various uses may be made of this device without departing from the principles disclosed herein and I therefore do not propose limiting the patent granted hereon otherwise than as necessitated by the appended claims.

What is claimed is:

1. A hopper structure for use in conjunction with portable storage bins comprising a rectangularly shaped frame structure, a hopper in the upper portion thereof, gate means on one end of the frame structure for entrance to the hopper, means on said frame structure for fastening the device to a portable storage bin whereby upon inverting the entire structure the contents of the portable storage bin may be delivered through the gate means of the hopper, said means for fastening the frame structure to the portable storage bin comprising bracket members having portions spaced from the sides of the frame structure, and said spaced bracket portions having apertures therein, pin means adapted for lateral passage through said bracket apertures, and said pin means adapted to engage within receiving portions of the portable storage bin whereby the hopper structure is fastened to the portable storage bin.

2. A device as set forth in claim 1 in which the means for fastening the frame structure to the portable storage bin further includes angle members along the top side of the frame structure for telescoping the portable storage bin and maintaining vertical alignment between the frame structure and storage bin.

3. In a hopper structure for reception of the contents of a portable storage bin comprising a frame structure having a hopper at the top thereof and an open frame work therebeneath, means for fastening an inverted portable storage bin to the top of said frame structure for dumping the contents thereof into the hopper, and means for mounting the bottom of said frame structure on an uprightly standing portable storage bin whereby the contents of the upper inverted storage bin are accessible through the hopper and the contents of the lower storage bin are accessible through the open frame work.

4. A device as set forth in claim 3 in which the hopper is provided with a vertically sliding door for opening of the hopper at one end thereof.

5. A device as set forth in claim 4 in which the vertically sliding door includes downwardly depending spaced rod members and cooperative tubular members on said frame work for vertical sliding of said rod members therewithin, and means for locking said vertically sliding door in open or closed position.

6. A device as set forth in claim 5 in which the means for maintaining the vertically sliding door in open or closed position comprises pin means adapted to engage aligned apertures in the downwardly depending rods and the tubular members on the frame work.

7. A device as set forth in claim 3 in which the means for fastening the frame structure to the portable storage bin includes oppositely disposed bracket members fastened to said frame structure and having outwardly disposed portions spaced from the sides of said frame structure, said spaced portions having apertures therethrough, the portable storage bin having upwardly extending bail means, pin means adapted to pass through the apertures in the spaced portions of the brackets and through the bail means on the portable storage bin whereby the hopper frame structure is fixed with respect to the portable storage bin.

RUSSELL L. FRANING.

REFERENCES CITED

The following references are of record in the file of this patent:

UNITED STATES PATENTS

| Number | Name | Date |
| --- | --- | --- |
| 866,724 | Hitzert | Sept. 24, 1907 |
| 2,440,056 | McIntyre et al. | Apr. 20, 1948 |